Aug. 31, 1937.                H. R. WEST                    2,091,842
                       INDUCTION VOLTAGE REGULATOR
                          Filed May 2, 1936
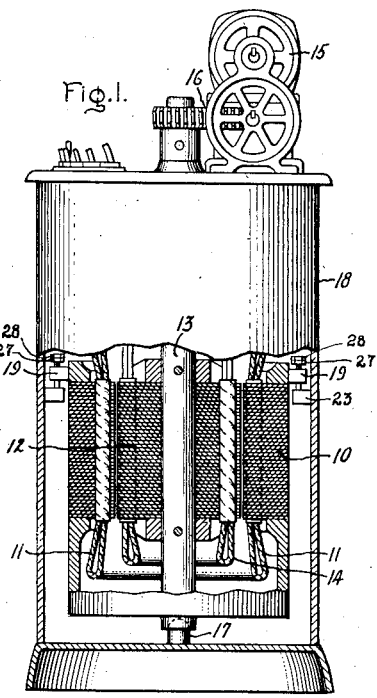
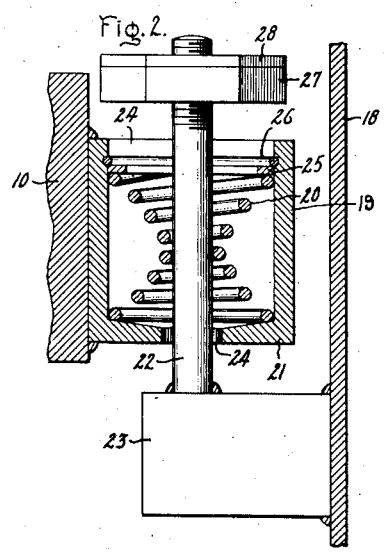
Inventor:
Harry R. West,
by Harry E. Dunham
His Attorney.

Patented Aug. 31, 1937

2,091,842

UNITED STATES PATENT OFFICE 2,091,842

INDUCTION VOLTAGE REGULATOR

Harry R. West, Pittsfield, Mass., assignor to General Electric Company, a corporation of New York Application May 2, 1936, Serial No. 77,483

2 Claims. (Cl. 171—119)

My invention relates to induction voltage regulators of the usual type including a stator and a rotor enclosed in a casing. The stator is a stationary hollow cylindrical core with a winding held in slots or grooves in its inner surface. The stator surrounds the rotor which is a cylindrical magnetic core with a winding held in slots or grooves in its outer surface. One of the windings, usually the rotor winding, is connected across the circuit in which the voltage is to be regulated and the other winding is connected in series with one side of that circuit. The rotor is mounted on a rotatable shaft and means are provided which act through the shaft to adjust the position of the rotor with respect to the stator so that the current in the primary or rotor winding will induce the proper voltage in the secondary or stator winding to raise or lower the voltage of the secondary circuit to the desired value.

The force or torque applied to the rotor by the adjusting means to maintain the rotor in the desired position with respect to the stator is opposed by a magnetic force or torque between the rotor and the stator. This magnetic torque varies with the position of the rotor and with the load on the regulator and may be of considerable magnitude, particularly in the case of a regulator of large capacity and under heavy load. The currents in the windings are of course always alternating currents so that the magnetic torque between the rotor and stator is vibratory in character and causes the rotor and stator to vibrate with a frequency equal to twice that of the currents in the windings. The rotor and stator with their windings are usually enclosed in a casing to which the stator is secured for support. The supporting connections between the stator and the casing tend to transmit the rotary vibrations of the stator to the casing and thus cause the regulator to be objectionably noisy.

The general object of the invention is to provide an improved construction and arrangement whereby the tendency of the vibration of the stator to produce objectionable noise outside the casing is greatly reduced.

The invention will be better understood from the following description taken in connection with the accompanying drawing in which Fig. 1 is a view, partly in section, of an induction voltage regulator supported in its casing in accordance with the invention, and Fig. 2 is an enlarged sectional view of one of the supports for the stator.

The induction voltage regulator, shown in Fig. 1, includes a hollow magnetic stator 10 with its winding 11 disposed in slots in its inner surface. The stator 10 surrounds a magnetic rotor 12 mounted on a shaft 13 and having windings 14 disposed in slots in its outer surface. The angular position of the rotor 12 may be adjusted and controlled by a motor 15 connected to the shaft through gearing 16. The stator 10 is pivotally mounted on a thrust bearing 17 arranged in line with the axis of the stator and between the bottom of the stator and the bottom or base of the casing 18 which encloses the regulator. The upper part of the stator 10 is connected to the side wall of the casing 18 by at least two resilient and vibration-absorbing or cushioning connections 19.

Each cushioning connection 19 includes a resilient coiled spring 20 secured in a spring casing 21 which is welded to the upper part of the stator 10. Each spring 20 is arranged with its axis parallel to the common axis of the stator 10 and rotor 12. A post 22 is mounted on a support 23 welded to the side wall of the casing 18 just below the spring 20 and its casing 21. The post 22 extends upwardly from its support 23 through an opening 24 in the bottom of the spring casing 21 and axially through the coiled spring 20. The two ends of the spring 20 fit closely in the spring casing 21, the spring being held securely in its casing by a hollow washer 25 and a spring ring 26. The center of the spring 20 is restricted in diameter to fit the post 22 and the openings 24 in the bottom and top of the spring casing 21 are large enough to permit free lateral motion of the casing 21 about the post. A nut 27 threaded onto the upper end of the post 22 and held in place by a locknut 28 prevents displacement of the regulator in its casing 18 in case the regulator and its casing are accidentally tipped over.

The engagement of the post 22 with the restricted part of the spring 20 provides a resilient connection between the stator 10 and its casing 18 so that any vibration of the stator in any direction will be effectively absorbed by the spring and its transmission to the casing 18 where it can cause objectionable noise greatly reduced. The springs 20 are particularly effective in absorbing vibrations due to the vibratory torque between the stator and rotor so as effectively to reduce transmission of these vibrations to the casing 18. At the same time the stator 10 is securely supported and positiond in its casing.

The invention has been explained by describing and illustrating a particular form thereof but it will be apparent that changes may be made without departing from the spirit of the invention and the scope of the appended claims.

What I claim as new and desire to secure by Letters Patent of the United States is:

1. An induction voltage regulator including a rotor and a stator member, a casing member therefor, a pivotal support for the stator, said support being arranged in line with the axis of the stator, a coiled spring having a restricted central portion, means securing the unrestricted ends of the spring to one of said members, and a post secured to the other of said members, said post extending axially through said spring and engaging the restricted portion thereof.

2. An induction voltage regulator including a rotor and a stator, a casing therefor, a pivotal support for the stator, said support being arranged in line with the axis of the stator, a coiled spring having a restricted central portion, means securing the unrestricted ends of the spring to the stator, and a post secured to the casing, said post extending axially through said spring and engaging the restricted portion thereof.

HARRY R. WEST.